United States Patent [19]

Preslik et al.

[11] Patent Number: 4,836,568
[45] Date of Patent: Jun. 6, 1989

[54] AERODYNAMICALLY STREAMLINED STEP ASSEMBLY FOR A TRUCK

[75] Inventors: Theresa D. Preslik; Ross Sasamura, both of Fremont, Calif.

[73] Assignee: Paccar Inc., Bellevue, Wash.

[21] Appl. No.: 96,728

[22] Filed: Sep. 14, 1987

[51] Int. Cl.⁴ .................... B60R 3/00; B62D 35/00
[52] U.S. Cl. .................... 280/164.1; 49/464; 220/1 V; 224/42.32; 280/163; 296/180.1
[58] Field of Search .......... 280/163, 164 R, 5 R, 280/5 A; 182/90, 903; 296/15, 180.1–180.5, 185; 244/129.4, 129.6; 224/42.32, 42.33; 220/DIG. 24, 1 V; 312/237, DIG. 33; 49/463, 464, 466

[56] References Cited

U.S. PATENT DOCUMENTS

| | | | |
|---|---|---|---|
| D. 114,579 | 5/1939 | King | 296/15 |
| 4,074,786 | 2/1978 | Joubert | 280/164 R |
| 4,093,300 | 6/1978 | Snizek | 296/15 |
| 4,273,394 | 6/1981 | Chandler | 312/DIG. 33 |
| 4,440,364 | 4/1984 | Cone et al. | 244/129.6 |
| 4,462,628 | 7/1984 | Gregg | 296/15 |
| 4,616,869 | 10/1986 | Sacco et al. | 180/903 |
| 4,659,154 | 4/1987 | Jenkins | 312/237 |

OTHER PUBLICATIONS

Peterbilt, Models 379 and 377, 12-1987.
Kenworth, T600A, 9—1988.

Primary Examiner—Charles A. Marmor
Assistant Examiner—Eric D. Culbreth
Attorney, Agent, or Firm—Flehr, Hohbach, Test, Albritton & Herbert

[57] ABSTRACT

A truck cab including entry doors on either side, a fender below and spaced in front of each entry door, and a fuel tank below and spaced behind each entry door is disclosed herein. The cab also includes aerodynamic step assembly which is located on each side of the cab below the entry door on that side and which contains a readily accessible tool or battery box. This box and the steps leading to the entry door are no wider than the door itself and therefore are spaced from the adjacent fender and fuel tank. However, aerodynamically shaped panels form part of the overall assembly for closing these spaces.

4 Claims, 4 Drawing Sheets

AERODYNAMICALLY STREAMLINED STEP ASSEMBLY FOR A TRUCK

The present invention relates generally to a heavy duty truck and more particularly to an aerodynamic step assembly allowing access to and located on each side of the truck cab and includes a readily accessible box for containing either tools or batteries.

A typical truck cab includes entry doors on either side, a step arrangement directly below and approximately the same width as each door, a fender in front of and spaced from the front edge of the step arrangement, and a fuel tank behind and spaced from the back edge of the step arrangement. It is typical to incorporate a tool box within one of these step arrangements and a battery box within the other arrangement.

A truck cab of the type described immediately above was heretofore manufactured by Peterbilt Motors Company, a division of Paccar, assignee of the present application. Note that each step arrangement allowing access to the truck cab is only as wide as its adjacent cab door and that there are spaces between the steps and the front fender and rearward fuel tank. Those spaces result in undue air turbulence during forward movement of the truck and they are not particularly attractive. One previously disclosed way of streamlining this section of the truck cab can be seen in a Kenworth truck which incorporates fairing panels all the way across the spaces between its step arrangement, its fender and fuel tank, but also across the body of its step arrangement. A significant disadvantage to this approach is in the fact that the entire fairing panel must be removed in order to gain access to the truck cab's tool box or batteries.

In view of the foregoing, it is an object of the present invention to aerodynamically streamline each step arrangement of a truck cab while, at the same time, allowing ready access to the truck cab's tool or battery box along side the truck without having to remove any fairing panels, as in the Kenworth truck discussed above.

As will be seen hereinafter, each of the aerodynamically streamlined step assemblies disclosed herein includes a combination box and step arrangement located in vertical alignment below and substantially equal in width to its adjacent entry door. This arrangement, in turn, includes a pair of steps and a box configured to contain either tools or batteries, depending on which arrangement the customer specifies. The box itself is directly accessible from outside the truck for gaining entry into the box. At the same time, each step assembly includes the means to mount a front fairing surface extending from the fender adjacent the box and step arrangement to the front edge of the latter in a generally rearwardly and inwardly curving manner, and a back fairing surface extending from the back edge of the arrangement to the front edge of the adjacent fuel tank in a generally rearwardly and outwardly curving manner. In this way, the two fairing surfaces entirely close the spaces which are otherwise present between opposite sides of the step arrangement and the fender and fuel tanks, and provide aerodynamic paths for the flow of air as the truck moves forward. In an actual working embodiment, one of the boxes, specifically the tool box, includes a hinge mounted door located between the two steps and moveable between an open position for gaining entry into the tool box from outside the truck and a closed position. The other box, specifically the battery box, includes a hinge mounted door located between the two steps and movable between an open position for allowing visual inspection of the truck batteries as well as access to fasteners which allow complete removal of the battery box lid including the top step and a closed position. The battery box lid includes the top step and is mounted for removal separate from the rest of the box and step arrangement to provide entry into the box.

The step assemblies will be described in more detail hereinafter, in conjunction with the drawings wherein.

Figure 1:
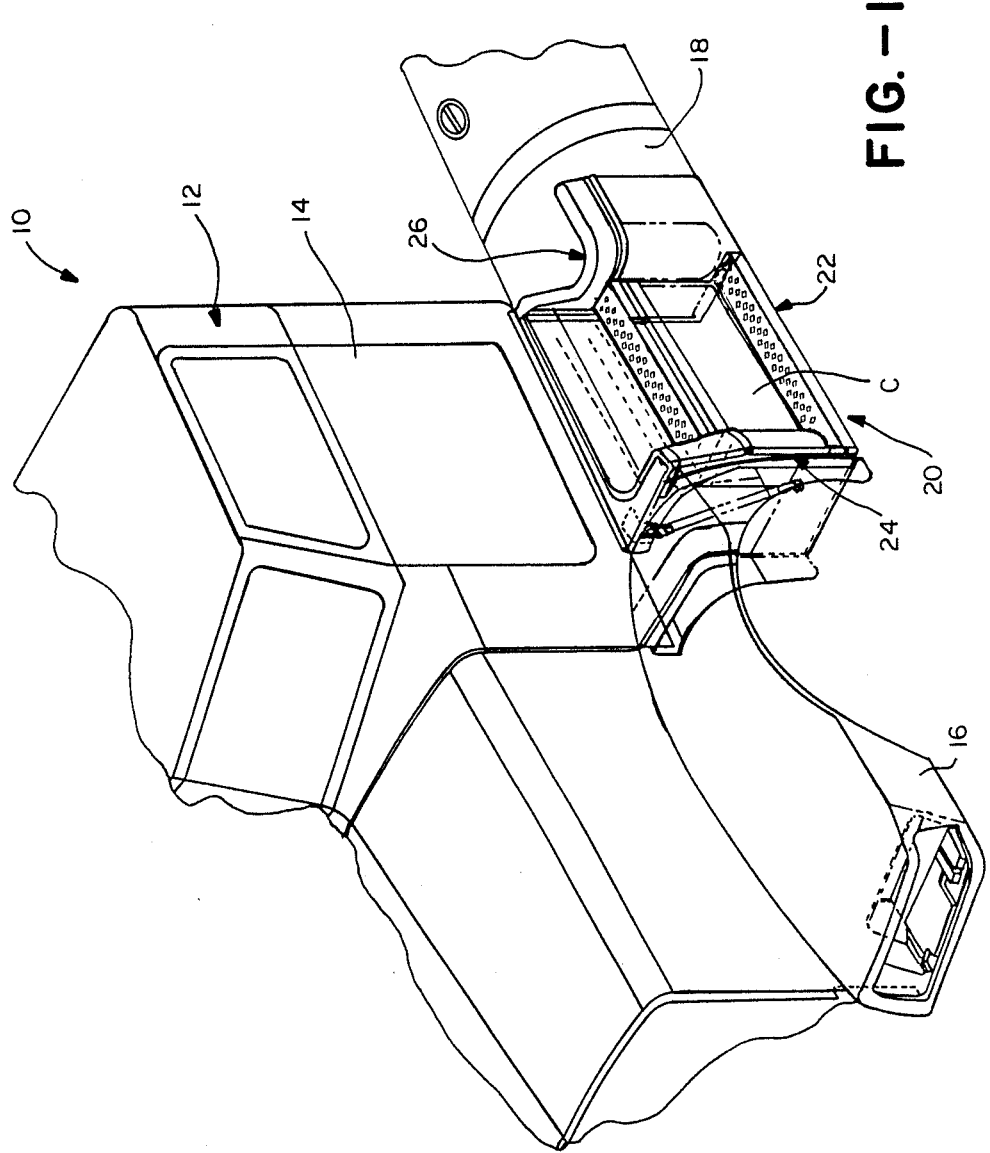
FIG. 1 is a perspective view of part of a truck cab including an aerodynamically streamlined step assembly designed in accordance with the present invention.

Turning now to the drawings, wherein like components are designated by like reference numerals throughout the various figures, attention is directed to FIG. 1. This figure illustrates part of a truck 10 having a cab 12 including entry doors 14 on either side, a fender 16 below and spaced in front of each entry door, and a fuel tank 18 below and spaced behind each entry door. The truck cab also includes a step assembly generally indicated by the reference numeral 20 on each side of the cab below the entry door on that side and between the adjacent fender 16 and fuel tank 18. As will be described below, each of these step assemblies is aerodynamically streamlined in accordance with the present invention, while, at the same time, functioning to provide steps into the cab 12 and to contain either a tool box or battery box which is directly accessible from outside the truck without having to remove the fairing panels, as in the case of the Kenworth truck described previously.

Figure 2:
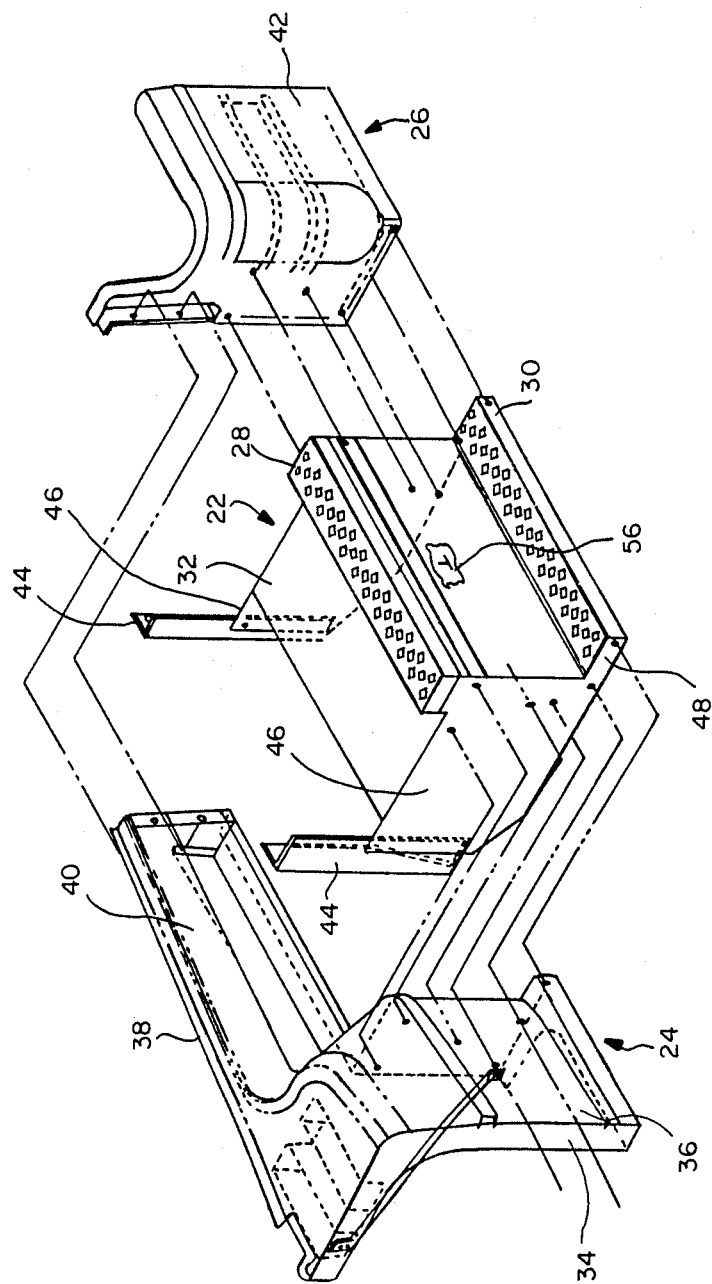
FIG. 2 is an exploded perspective view of the step assembly of FIG. 1, specifically illustrating a box and step arrangement and fairing panels forming the overall assembly.

Turning to FIG. 2 in conjunction with FIG. 1, attention is now directed to one of the step assemblies, specifically the one illustrated in FIG. 1. As seen in FIG. 2, this step assembly is comprised of three primary components, a combination box and step arrangement 22 and two fairing panels 24 and 26. As illustrated in FIG. 1, the combination box and step arrangement 22 is located in vertical alignment immediately below and substantially equal in width to its adjacent entry door 14. This arrangement includes a pair of steps, a top step 28 and a bottom step 30, and a tool box 32 which is directly accessible from outside the truck, as will be described hereinafter. Fairing 24 includes a front section 34 which defines a front fairing face 36 extending from adjacent fender 16 to the front edge of box and step arrangement 22, and a top section 38 defining a top fairing surface 40 extending across the top side of arrangement 22 immediately below adjacent cab entry door 14. Fairing panel 26 defines a back fairing surface 42 extending from the back edge of arrangement 22 to the front edge of the adjacent fuel tank 18. As will be described in more detail hereinafter, the two fairing panels aerodynamically streamline the space around the box and step arrangement.

Figure 3:
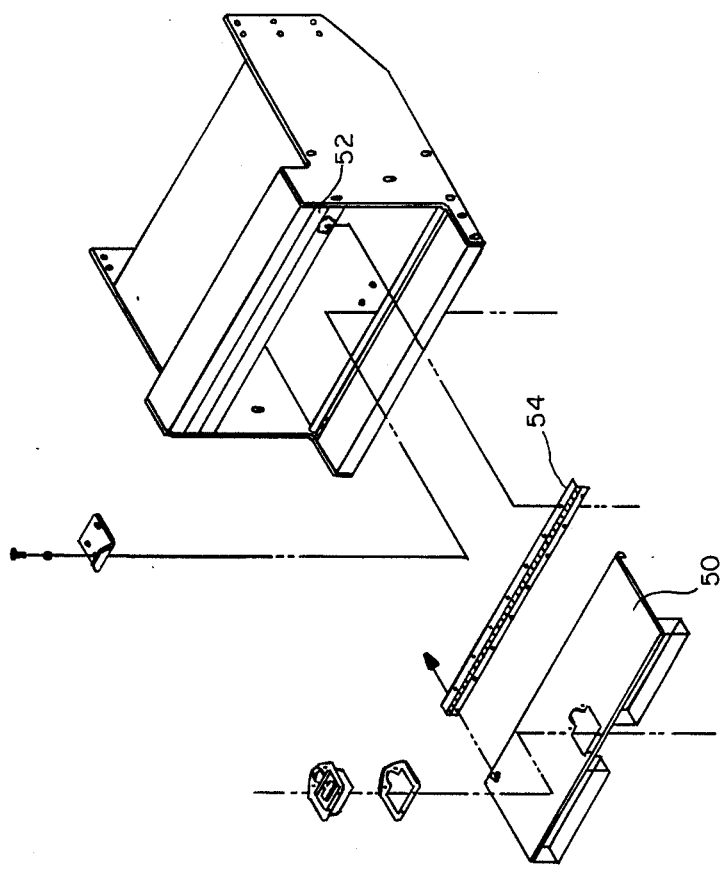
FIG. 3 is an exploded perspective view of the box and step arrangement illustrated in FIG. 2 including specifically a tool box.

Referring to FIG. 3 in conjunction with FIG. 2, attention is directed specifically to box and step arrangement 22. As seen in these figures, tool box 32 is generally rectangular in shape and supports top step 28 along its top outer edge. The box itself is mounted in place by support flanges 44 which connect with the side plates 46 of box 32. Bottom step 30 is mounted to the front of the box along its bottom edge and extends out from there. Steps 28 and 30 may be bonded or otherwise fixed in place to sides 46 of box 32 and extensions 48 respectively.

As illustrated specifically in FIG. 3, the front face of box 32 includes a front panel 50 which is hinge connected to a top front section 52 of the box by means of a piano hinge 54. The front panel 50 serves as an entry door into the box and is moveable between the closed position and an opened position. To this end, panel 50 includes a latch mechanism 56, preferably one that locks.

Turning to FIG. 1 in conjunction with FIG. 2, it can be seen that fairing panel 24 is mounted on the front side and over tool box 32 so that section 34 rests directly against and extends out from the tool box while top section 38 sits directly over but spaced above the tool box immediately behind top step 28. At the same time, fairing panel 26 is mounted to the back side of the tool box so that it projects out from the front panel 56 of the box. The two fairing panels are mounted by bolts or other such suitable means to side plates 46 of box 32.

It should be apparent from the foregoing and particularly from FIG. 1 that when the entire step assembly 20 is assembled, panel 50 which serves as an entry door for tool box 32 is readily accessible from outside the truck without disassembling fairing panels. All that is necessary is that the panel be pivoted upward. At the same time, it should be apparent that the fairing surfaces 36, 40 and 42 close the spaces around the box and step arrangement and specifically those spaces that would otherwise be present between the arrangement, truck cab 12, fender 16, and fuel tank 18.

Only one of the step assemblies 20 was described above, specifically the one illustrated in FIG. 1. It is to be understood that the step assembly on the other side of the truck is identical, with one possible exception. Specifically, the other step assembly utilizes a box and step arrangement which typically includes a battery box rather than the described tool box 32. The battery box will be described in detail below in conjunction with FIG. 4. It suffices here merely to point out that the fairing panels comprising part of this other step assembly may be identical or substantially identical to fairing panels 24 and 26. The battery box, on the other hand, rather than including only a hinge mounted door for visual inspection of the batteries, also includes a top cover section which is entirely removable for battery service and removal. While most trucks include a tool box on one side and a battery box on the other side, it is possible for trucks to be designed to include only one or the other or identical boxes on each side.

Figure 4:
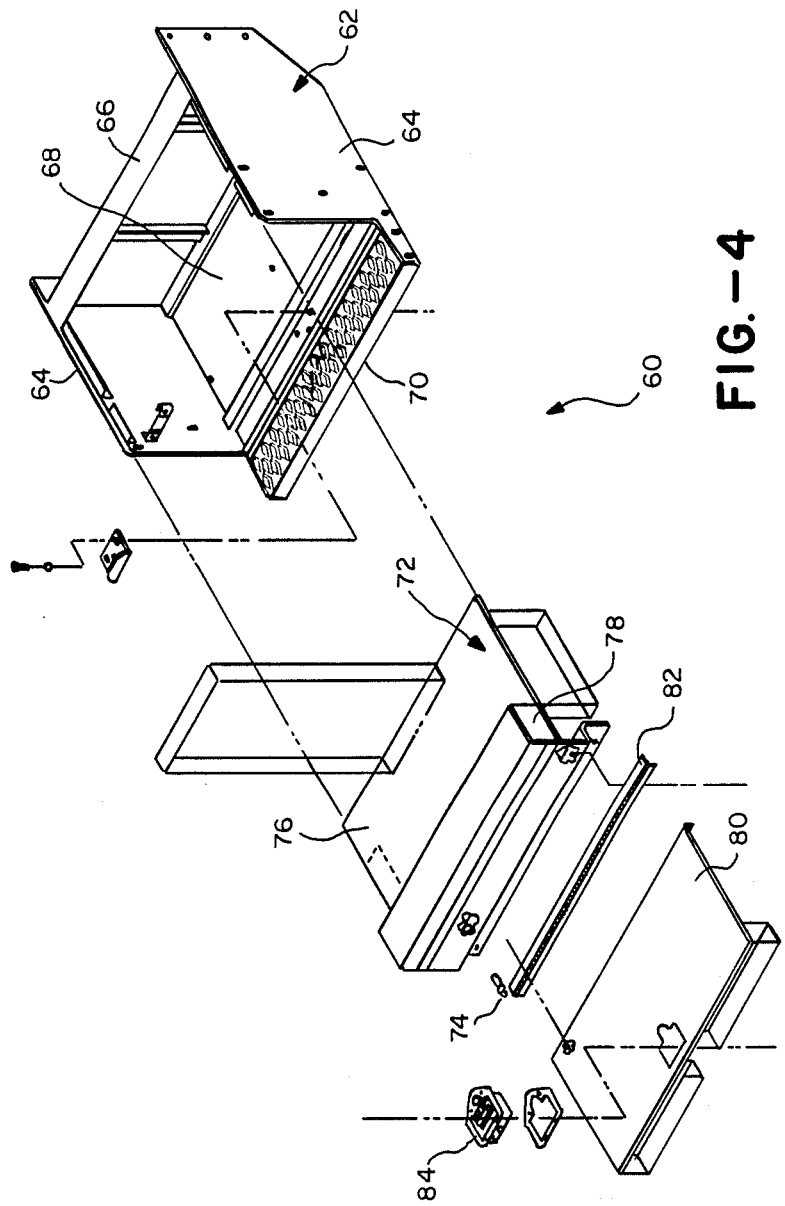
FIG. 4 is an exploded perspective view of a different type of box and step arrangement, specifically one which includes a battery box.

Referring to FIG. 4, the combination box and step arrangement forming part of the other step assembly is shown there and designated by the reference numeral 60. This arrangement includes a main box body 62 having side walls 64, a back side 66 and a closed bottom 68. Otherwise, box body 62 is opened at its top and its front and supports a bottom step 70 along the bottom front edge.

A removable top cover 72 is bolted within box body 62 for easy removal by suitable bolts generally indicated at 74. Battery box cover 72 includes a top side 76 of the overall box and supports the top step 78 at its front edge. When the cover 72 is bolted within box body 62, the box is closed, except for its front face. A front panel 80 is hinge mounted to the box cover 72 just below step 78 and above bolts 74 by means of a piano hinge 82. In that way, the panel 80 serves to close the box and, at the same time, it allows visual inspection of the batteries and ready access to bolts 74 which can be readily removed to slide battery box cover 72 from box body 62 to service or remove batteries. Like panel 50, panel 80 includes an appropriate latch 84 which preferably includes a lock. Thus, if the entire step assembly including box and step arrangement 60 were shown assembled, it would look very much like the assembly 20 shown in FIG. 1. The only difference is the battery box cover 72 including hinged top panel 80 can be completely removed from box body 62.

What is claimed:

1. In a truck having a cab including entry doors on either side, a fender below and spaced in front of each entry door, and a fuel tank below and spaced behind each entry door, the improvement comprising a combination storage box and step assembly mounted on each side of said cab below and in vertical alignment with the entry door on that side and between the adjacent fender and fuel tank, each of said combination storage box and step assemblies including:

(a) a generally rectangular storage box and a pair of steps mounted thereon, said storage box having access means providing direct access to an interior space of said storage box from outside the truck;

(b) a first fairing panel mounted on said combination storage box and step assembly, said first fairing panel having a front fairing surface extending from the adjacent fender to a front edge of the combination storage box and step assembly, said front fairing surface curving generally rearwardly and inwardly from the adjacent fender, and a second fairing panel mounted on said combination storage box and step assembly, said second fairing panel having a back fairing surface extending from a back edge of said combination storage box and step assembly to a front edge of the adjacent fuel tank, said second fairing panel curving generally rearwardly and outwardly with respect to combination storage box and step assembly, whereby said first and second fairing panels cover spaces between said combination storage box and step assembly and the adjacent fender and fuel tank, respectively, and provide an aerodynamic path for the flow of air as the truck moves forward;

(c) said combination storage box and step assembly including a hinge mounted door serving as said access means, said door being located between said pair of steps and movable between an opened position for gaining access to said storage box from outside the truck and a closed position for enclosing said storage box from outside the truck; and (d) a top fairing surface extending between said front fairing surface and said back fairing surface and between said combination storage box and step assembly and said cab just below the adjacent entry door.

2. The improvement according to claim 1 wherein said combination storage box and step assembly includes a removable top cover forming its top side, an supporting a top step at its front edge, said removable top cover serving as said access means and being adjustable between a first assembled position for enclosing said storage box from outside the truck and a second disassembled position for gaining access to said storage box.

3. A combination storage box and step assembly forming part of a truck having a cab with entry doors on either side, fenders below and spaced in front of each entry door, and a fuel tank below and spaced behind each entry door, said combination storage box and step assembly being mounted on each side of said cab below and in vertical alignment with one of the entry doors and between the adjacent fender and fuel tank, said combination storage box and step assembly comprising:

(a) a generally rectangular storage box and a pair of steps mounted thereon, said storage box having access means providing direct access to an interior space of said storage box from outside the truck;

(b) a front fairing surface extending from the adjacent fender to a front edge of the combination storage box and step assembly, said front fairing surface curving generally rearwardly and inwardly from the adjacent fender, and a back fairing surface extending from a back edge of said combination storage box and step assembly to a front edge of the adjacent fuel tank, said back fairing surface curving generally rearwardly and outwardly with respect to said combination storage box and step assembly, whereby said front and back fairing surfaces cover spaces between said combination storage box and step assembly and the adjacent fender and fuel tank, respectively, and provide an aerodynamic path for the flow of air as the truck moves forward;

(c) a hinge mounted door serving as said access means, said door being located between said pair of steps and being movable between a closed position for enclosing said storage box and an opened position for gaining access to said storage box from outside the truck; and (d) a top fairing surface extending between said front fairing surface and said back fairing surface and between said combination storage box and step assembly and said cab just below the adjacent entry door.

4. A combination storage box and step assembly according to claim 3 wherein said storage box and step assembly includes a removable top cover forming its top side and supporting a top step at its front edge, said removable top cover serving as said access means and being movable between a first assembled position for enclosing said storage box from outside the truck and a second disassembled position for gaining access to said storage box.

* * * * *